(12) United States Patent
Hukee

(10) Patent No.: US 6,190,654 B1
(45) Date of Patent: Feb. 20, 2001

(54) LIGHT REFLECTING FISH EXCITER AND ATTRACTANT COMPRISED OF MICA FLAKES

(76) Inventor: Ken Hukee, 4957 Wood St., La Mesa, CA (US) 91941

( * ) Notice: Under 35 U.S.C. 154(b), the term of this patent shall be extended for 0 days.

(21) Appl. No.: 09/271,363

(22) Filed: Mar. 16, 1999

Related U.S. Application Data

(60) Provisional application No. 60/078,059, filed on Mar. 16, 1998.

(51) Int. Cl.[7] .......................... A01N 25/12; A01N 25/24; A01N 59/00; A01N 59/06; A01K 85/00
(52) U.S. Cl. .......................... 424/84; 424/407; 424/405; 424/410; 424/489; 424/77; 424/520; 424/684; 424/691; 424/724; 426/1; 514/951; 43/42
(58) Field of Search .............................. 424/84, 407, 405, 424/410, 489, 77, 520, 684, 691, 724; 426/1; 514/951; 43/42

(56) References Cited

U.S. PATENT DOCUMENTS

| | | | |
|---|---|---|---|
| 3,413,750 | 12/1968 | Henry | 43/42.33 |
| 3,953,934 | 5/1976 | Visser | 43/42.06 |
| 3,974,591 | 8/1976 | Ray | 43/44.99 |
| 4,205,997 | 6/1980 | Hesse | 524/548 |
| 4,828,829 | 5/1989 | Bethshears | 424/84 |
| 4,862,626 | 9/1989 | Hamaguchi | 43/4.5 |
| 4,956,934 | 9/1990 | Dahl | 43/42.31 |
| 5,044,110 | 9/1991 | Henderson | 43/42.33 |
| 5,071,659 | 12/1991 | Shumaker | 426/1 |
| 5,415,862 | 5/1995 | Bethshears | 424/410 |
| 6,084,018 | * 7/2000 | Wildburg et al. | 524/424 |
| 6,090,195 | * 7/2000 | Andersen et al. | 106/162.51 |

FOREIGN PATENT DOCUMENTS

| | | | |
|---|---|---|---|
| 2-86740 | * | 3/1990 | (JP) . |
| 58-101650 | * | 3/1990 | (JP) . |

OTHER PUBLICATIONS

JPAB Abstract Pub No. JP402086740A, abstracting JP 2–86740, 1990.*
Derwent Abstract Accession No. 1983–719690, abstracting JP 58–101650, 1983.*
JAPB Abstract Pub No. JP358101650A, abstracting JP 58–101650, 1983.*
Chemical Abstracts 71:93430u, 1969.*
Chemical Abstracts 87:29171p, 1977.*
Chemical Abstracts 105:99283r, 1986.*
Chemical Abstracts 96:74956v, 1982.*

* cited by examiner

*Primary Examiner*—John Pak
(74) *Attorney, Agent, or Firm*—Tom Hamill Jr.

(57) ABSTRACT

A light reflecting fish attractant comprised of mica flakes is provided. The mica flakes are cast into the water where they slowly sink to the bottom. During their descent, they cascade wildly with the eddies and currents of the water. The light which filters down into the water is reflected off the mica, causing a glittering or flashing. This reflected light attracts fish into the area. The mica flakes are chosen to be sized in the range of 0.001 inch to about 3.0 inch in length, in the range of 0.001 inch to about 3 inch in width and about any size larger than 0.001 inch in thickness. This size range permits the mica flakes to approximate the common sizes of fish scales. The mica flakes giving the appearance of fish scales attracts predator fish to the area where the mica flakes are introduced. After introducing the mica flakes to the water, the sportsman would introduce the fishing line to the area where the flakes have been placed. The odds of a strike on the fishing lure is increased due to the greater number of fish being in the area and having their predatory sense excited. It is also proposed that mica flakes may be mixed directly with a chum composition and introduced into the water. A chum composition includes well known fish attractants including proteins, vegetable oils and extracts, and meat oils, blood and meat extracts.

5 Claims, 1 Drawing Sheet

LIGHT REFLECTING FISH EXCITER AND ATTRACTANT COMPRISED OF MICA FLAKES

RELATED APPLICATIONS

This Utility Patent Application claims priority from U.S. Provisional Patent Application Ser. No. 60/078,059 which was filed on Mar. 16, 1998.

BACKGROUND OF THE INVENTION

1. Field of the Invention

The present invention relates generally to fishing through the use of fish excitation and attraction means. The fish excitation and attraction means includes mica flakes which would be sprinkled onto the water proximal to where the fishing would occur. The reflection of light off of the reflective surfaces of the mica crystals causes the attraction as well as the excitation of fish. It is also proposed to mix mica with chum and introduce this composition to the water to attract fish.

2. Description of the Prior Art

Devices have been located which are considered prior art. They include the following U.S. patents:
U.S. Pat. No. 5,415,862 issued to Bethshears el al.
U.S. Pat. No. 5,071,659 issued to Shumaker
U.S. Pat. No. 5,044,110 issued to Henderson et al.
U.S. Pat. No. 4,956,934 issued to Dhal
U.S. Pat. No. 4,862,626 issued to Hanaguchi
U.S. Pat. No. 4,828,829 issued to Bethshears
U.S. Pat. No. 4,205,997 issued to Hesse et al.
U.S. Pat. No. 3,974,591 issued to Ray
U.S. Pat. No. 3,953,937 issued to Visser
U.S. Pat. No. 3,413,750 issued to Henry The foregoing body of prior art indicates it to be well known to use fishing lures with small reflective patches located thereon, or particles with entrained fish attractant compositions, such compositions being both olfactory, and/or taste related. Such compositions include oils and the like. None of the patents disclose the use of mica to cause a flashing or glittering to attract fish to a region where one is fishing. Mica, by its unique crystalline cleavage, reflectivity, density, minimal environmental impact as well as other material properties makes it an ideal attractant and has no way been discussed, taught or contemplated in the prior art. Even mica being present in chum has not been specifically disclosed, further, mica is non-harmful to fish if ingested. Other advantages of the present invention over the prior art also will be rendered evident.

SUMMARY OF THE INVENTION

Mica is a broad term to describe any one of the minerals which are included in the mica mineral family. These minerals include several potassium aluminosilicates. Two of the most common micas are Muscovite or white mica, and Biotite or black mica. The micas have excellent cleavage properties, where cleavage is defined as a direction of weakness, that, when broken, produces a smooth plane that reflects light. Muscovite is generally colorless to light yellow, bronze, gold or green, is somewhat transparent in thin sheets which are very elastic, has a cleavage in the 1 direction, and a hardness of 2 to 2.5 on the Mohs Scale of Hardness. Biotite is brown to black in color, also has a cleavage in the 1 direction and has a hardness of 2.5 to 3. Micas are commonly occurring minerals and the family is one of the top ten most common minerals found in the Earth's crust. Mica may be broken into small pieces, which have an irregular perimeter, are flat on the top and bottom sides and have a very thin thickness. Mica has a density greater than water and is non-soluble in water, therefore, mica will sink in water but not dissolve. Mica is non-toxic and non-harmful to the environment. Mica does not decompose under ordinary temperatures and pressures. Mica does not decompose in any time period which is relevant to the human condition. Even if consumed, mica is non-toxic and non-harmful to fish, animals and humans.

It is a well known fact that light will pass through the surface of a body of water and will penetrate a substantial distance into the depths of such a body of water. Mica has a cleavage in the 1 direction, giving it two reflective surfaces. When mica is introduced into an illuminated body of water, the flat top and flat bottom sides will reflect the light causing a flashing or glittering effect underwater. Also, due to the mica's irregular shape and flat surfaces, it will descend through the body of water in a generally random fashion, rapidly rotating, flipping and changing its orientation. This random and rapid orientation change causes light reflections to occur in many directions, and such a motion, coupled with the flashing, causes fish and the like to be attracted to the source of activity. It also stimulates and excites the fish, causing the fish to bite and attack objects in the water as possible food sources. This excitation will induce the fish to strike any lure which may be in the area. The mica flakes are chosen to approximate the general size of fish scales, and as such, give the illusion of a possible food source for the fish.

The mica flakes may be cast into the water over the sides of a pier, off a boat, off a jetty, or off of any floatation device. They may be tossed from shore to an area of the water in a slightly weighted pouch, in some embodiments, the pouch may dissolve in the water, permitting the mica to disperse. Other means to launch the mica flakes into a desired area are possible and are considered to be in the scope of this application.

To achieve the foregoing and other advantages, the present invention, briefly described, provides mica flakes in a size and configuration which are to be sprinkled or introduced in some matter into a body of water where one desires to fish. At that point, the fisherman will cast into the same area that the mica flakes are introduced with a baited line, and since the fish have been attracted to that area by the flashing of the mica flakes, the odds of the fish taking the bait are increased.

Mica is easily reduced from its crystalline configuration to a comminuted state by any known comminuting method. As a matter of fact, it is difficult to keep mica in its crystalline shape as it easily fractures and breaks. The mica is comminuted to the desired size and is packaged for sale. Due to the inherent properties of mica, it will have an indefinite shelf life, is non-polluting and is inexpensive.

The above brief description sets forth rather broadly the more important features of the present invention in order that the detailed description thereof that follows may be better understood, and in order that the present contributions to the art may be better appreciated. There are, of course, additional features of the invention that will be described hereinafter and which will form the subject matter of the claims appended hereto.

In this respect, before explaining the preferred embodiment of the invention in detail, it is to be understood that the invention is not limited in its application to the details of the construction and to the arrangements of the components set forth in the following description or illustrated in the drawings. The invention is capable of other embodiments and of being practiced and carried out in various ways. Also, it is to be understood, that the phraseology and terminology employed herein are for the purpose of description and should not be regarded as limiting.

As such, those skilled in the art will appreciate that the conception, upon which this disclosure is based, may readily be utilized as a basis for designing other structures, methods, and systems for carrying out the several purposes of the present invention. It is important, therefore, that the claims be regarded as including such equivalent constructions insofar as they do not depart from the spirit and scope of the present invention.

It is therefore an object of the present invention to provide a fish attractant which is comprised of mica, the mica approximating the size of fish scales.

Another object of the present invention is to provide a fish attractant wherein the mica is processed to be a size generally less than 3 inches long, three inches wide and generally less than 0.2 inch thick.

An object of the present invention is to provide a fish attractant which may be employed in fresh, salt or brackish waters.

It is another object of the present invention to provide a new an improved fish attractant which is environmentally friendly, does not harm fish when ingested, and further would not harm any other animal on either end of the food chain if introduced, does not require chemical enhancement, and is safe to use.

Another object of the present invention is to provide a fish attractant which has an indefinite shelf life.

Another object of the present invention is to provide a fish attractant which may be used in the place of chum.

Another object of the present invention is to provide a fish attractant which may be combined with chum in order to increase the attract ability of the chum.

Another object of the present invention is to provide a fish attractant which excites and stimulates the fish, causing them to strike objects in the water proximal their position.

It is a further object of the present invention to provide a mica fish attractant which may be used while trolling from a boat.

It is a further object of the present invention to integrate mica with an adhesive or adhesive like material, and apply said mixture of mica and adhesive like material proximal a plug, hook or bait holder, and then cast said mica covered device into the water. In this case the adhesive will dissolve, releasing the mica into the water.

An even further object of the present invention is to provide a fish attractant which is susceptible of a low cost of manufacture with regard to both materials and labor, may be easily packaged, and which accordingly is then susceptible of low prices of sale to the consuming public, thereby making such mica fish attractant available to the buying public.

These together with still other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and the above objects as well as objects other than those set forth above will become more apparent after a study of the following detailed description thereof. Such description makes reference to the annexed drawings wherein.

DESCRIPTION OF THE PREFERRED EMBODIMENT

Figure 1:
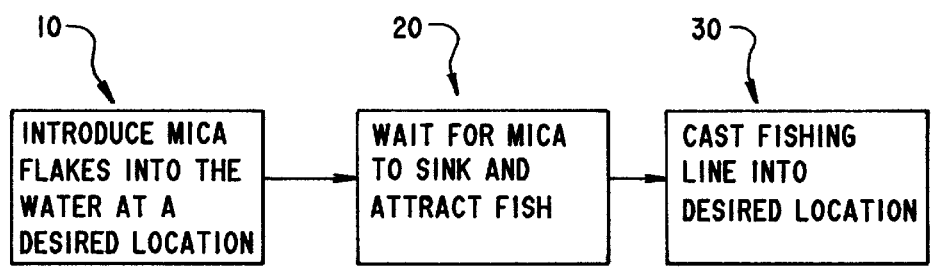
FIG. 1 is a block diagram describing how to employ the mica fish exciter and attractant.

With reference now to the drawings, a mica fish exciter and attractant embodying the principles and concepts of the present invention will be described. Turning now specifically to FIG. 1, a block diagram describing how to use the fish exciter and attractant is shown. The first step 10 is to introduce the mica flakes into the water at a desired location. A desired location may be one where fish are known to gather, which has been identified by a fish finder, or has been reported as where fish are 'running'. This may be done from the side of a boat, while trolling, be thrown from shore, or by any of a variety of methods. The second step 20 is to wait for the mica flakes to begin their descent toward the bottom. This permits the mica flakes to cascade in a downward fashion, glinting and glittering due to the reflection of incident light. This "flashing" of reflected light off the mica flakes attracts fish to the desired location. This also excites their predatory desires, causing the fish to strike at objects which are proximal to their location. The third step 30 is to place the fishing line into the desired location by casting, trolling or by other means. The line would include standard lures or baits attached as is well known. Due to the action of the fish attractant, there will be more fish in the desired area, thus increasing the chances of landing a bite and catching such a fish. Also, the fish in that area will have their predatory senses excited, therefore increasing the chances of having a strike on the lure. The introduction of the instant invention into a region where there are known to be fish will increase the odds of a strike on a lure due to the excitation of this predatory sense.

Once again, the mica flakes are chosen to be sized in the range of 0.001 inch to about 3.0 inch in length, in the range of 0.001 inch to about 3 inch in width and above about 0.001 inch in thickness. This size range permits the mica flakes to approximate the common sizes of fish scales. This "fish scale" appearance attracts fish to the area as it gives the illusion of a easy food source.

It has also been proposed to combine the mica flakes above with a fish chum to increase the fish chums attractiveness to fish. The flashing of the mica flakes combined with the smell and taste of the chum drives the fish into a feeding frenzy. They will be snapping at the chum particles and any lure which may be in that area.

It has been further considered that the mica flakes may be mixed with a generally adhesive or mixing compound and then applied to a fishing plug, lure or hook. In this fashion, when the plug, lure or hook is introduced into the water, the mica flakes would issue forth into the water surrounding the plug, lure or hook and thus attract and excite fish in the aforementioned manner. Such compounds which have been evaluated are petroleum jelly and soft waxes as are often found in chap stick style lip balms. Additional compositions may prove, such as water soluble adhesive compositions, may prove to be satisfactory vehicles to entrain the mica flakes within and as such, these compositions are considered to be included in the scope of this application.

Figure 2:
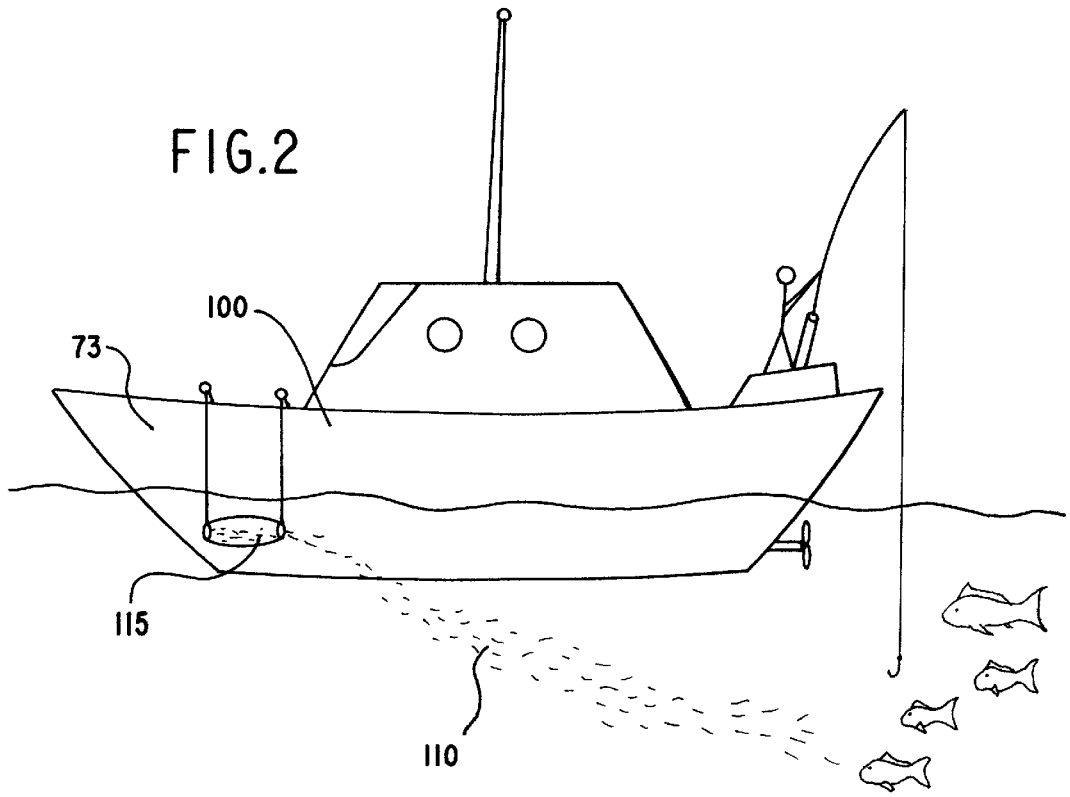
FIG. 2 is an environmental view showing one of many means that mica may be propagated from a sea going vessel.

Referring now specifically to FIG. 2, when trolling or stationary fishing, means to distribute the mica flakes 110 proximal the boat have been devised. These include tea-bag style structures with an opening proximal the top portions of their structure. As the boat is rolled by the action of the waves, mica flakes are disbursed from the bag structures by the action of the waves. This method has been found to attract fish very efficiently. Also, elongated, stocking type structures 115 with openings at both ends have been found to be particularly useful. These are filled with mica and suspended over the side of a boat. As the boat trolls, the action of the water removes the mica from the stocking into the water, causing a continuous cascade of the mica flakes 110. This method of dispersal has also been found to be particularly effective.

With respect to the above description, it should be realized that the optimum dimensional relationships for the parts of the invention, to include variations in size, materials, shape, form, function and manner of operation, assembly and use, are deemed readily apparent and obvious to those skilled in the art, and therefore, all relationships equivalent to those illustrated in the drawings and described in the specification are intended to be encompassed only by the scope of appended claims.

While the present invention has been shown in the drawings and fully described above with particularity and detail in connection with what is presently deemed to be the most practical and preferred embodiment of the invention, it will be apparent to those of ordinary skill in the art that many modifications thereof may be made without departing from the principles and concepts set forth herein. Hence, the proper scope of the present invention should be determined only by the broadest interpretation of the appended claims so as to encompass all such modifications and equivalents.

What is claimed as being new and desired to be protected by Letters Patent of the United States is as follows:

1. A fish attractant comprising a mixture of mica and an adhesive substance, said mica being of a particle size of about between 3.0 and 0.001 inch in length, of about between 3.0 and 0.001 inch in width and of about 0.10 to 0.001 inch in thickness, whereby said mixture of adhesive substance and mica is capable of being adhered to a fishing plug, lure or hook.

2. A fish attractant as claimed in claim 1 wherein said adhesive substance is water soluble.

3. A fish attractant as claimed in claim 1 wherein said adhesive substance is water insoluble.

4. A fish attractant as claimed in claim 3 wherein said adhesive substance is an adhesive substance selected from the group consisting of petroleum jelly and wax.

5. A fish attractant as claimed in claim 1 wherein said mixture of adhesive substance and mica further includes fish chum, said fish chum selected from the group consisting of meat, vegetables, and extracts thereof.

* * * * *